US012726328B2

(12) United States Patent
Tamiya et al.

(10) Patent No.: US 12,726,328 B2
(45) Date of Patent: Sep. 1, 2026

(54) HOMOMORPHIC CYCLIC OPERATION SYSTEM, HOMOMORPHIC CYCLIC OPERATION APPARATUS, HOMOMORPHIC CYCLIC OPERATION METHOD, AND HOMOMORPHIC CYCLIC OPERATION PROGRAM

(71) Applicant: NEC Corporation, Tokyo (JP)

(72) Inventors: Hiroto Tamiya, Tokyo (JP); Toshiyuki Isshiki, Tokyo (JP); Kengo Mori, Tokyo (JP); Sanami Nakagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 39 days.

(21) Appl. No.: 18/291,341

(22) PCT Filed: Jul. 29, 2021

(86) PCT No.: PCT/JP2021/028209

§ 371 (c)(1), (2) Date: Jan. 23, 2024

(87) PCT Pub. No.: WO2023/007680

PCT Pub. Date: Feb. 2, 2023

(65) Prior Publication Data

US 2024/0214178 A1 Jun. 27, 2024

(51) Int. Cl.

*H04L 9/00* (2022.01)
*G09C 1/00* (2006.01)
*H04L 9/30* (2006.01)

(52) U.S. Cl.

CPC ................ *H04L 9/008* (2013.01); *G09C 1/00* (2013.01); *H04L 9/3026* (2013.01); *H04L 9/3093* (2013.01)

(58) Field of Classification Search

CPC ..... H04L 9/008; H04L 9/3026; H04L 9/3093; G09C 1/00

See application file for complete search history.

(56) References Cited

U.S. PATENT DOCUMENTS 8,515,058 B1 * 8/2013 Gentry .................... H04L 9/008 380/28
9,893,880 B2 * 2/2018 Rohloff ................... H04L 9/008

(Continued)

FOREIGN PATENT DOCUMENTS

JP 2016-111594 A 6/2016
WO 2013/046320 A1 4/2013
WO 2017/061024 A1 4/2017

OTHER PUBLICATIONS

International Search Report for PCT Application No. PCT/JP2021/028209, mailed on Sep. 21, 2021.

(Continued)

*Primary Examiner* — Ellen Tran
(74) *Attorney, Agent, or Firm* — Sughrue Mion, PLLC

(57) ABSTRACT

A homomorphic cyclic operation system performs a homomorphic cyclic operation on a periodic array of data using homomorphic encryption having a homomorphic operation defined with respect to at least one multiplication and comprises: an encryption apparatus that encrypts the periodic array of data by storing it in the coefficients of an indeterminate polynomial to generate a ciphertext of periodic data; and a homomorphic cyclic operation apparatus that shifts the periodic array of data in the ciphertext of the periodic data by applying the indeterminate raised to the power of a shift amount to the ciphertext of the periodic data.

19 Claims, 12 Drawing Sheets

(56) References Cited

U.S. PATENT DOCUMENTS

| | | | | |
|---|---|---|---|---|
| 10,116,437 | B1 * | 10/2018 | Krendelev | H04L 63/0457 |
| 10,333,696 | B2 * | 6/2019 | Ahmed | H04L 9/3268 |
| 2014/0208101 | A1 | 7/2014 | Naganuma | |
| 2016/0352510 | A1 * | 12/2016 | Morikawa | G09C 1/00 |
| 2018/0278410 | A1 | 9/2018 | Hirano et al. | |
| 2019/0140818 | A1 * | 5/2019 | Bent | H04L 9/3093 |
| 2020/0244435 | A1 * | 7/2020 | Shpurov | G06F 21/64 |

OTHER PUBLICATIONS

Yasuda M., Shimoyama T., Kogure J., Yokoyama K., Koshiba T. (2013) “Packed Homomorphic Encryption Based on Ideal Lattices and Its Application to Biometrics.”

Chillotti, I. et al. ’THE: fast fully homomorphic encryption over the torus, cryptology ePrint Archive: Report 2018/421, Apr. 2019, pp. 1-62, [online], [retrieved on Sep. 14, 2021], retrieved from <https://eprint.iacr.org/2018/421>, pp. 36-38.

Imabayashi, Hiraki et al., “Streamline Computation of Secure Frequent Pattern Mining by Fully Homomorphic Encryption”, IPSJ Transactions on Databases (TOD), Mar. 22, 2017, vol. 10, No. 1, pp. 1-12, [online], pp. 5, 6.

* cited by examiner $$<A, B> = +5 + 0 + 0 + \ldots + 0 + 0 + 0$$

FIG. 11

| | Redundant portion | | | 1 cycle of data | | | Redundant portion | | |
|---|---|---|---|---|---|---|---|---|---|
| T | Tx_{r_size-s_r} | ... | Tx_{r_size-1} | Tx_0 | ... | Tx_{r_size-1} | Tx_0 | ... | T_{s_1} |

FIG. 12

| | Zero vectors | | | 1 cycle of data | | | Zero vectors | | |
|---|---|---|---|---|---|---|---|---|---|
| B | 0 | ··· | 0 | $B_{y\_0}$ | ··· | $B_{y\_\{r\_size-1\}}$ | 0 | ··· | 0 |

HOMOMORPHIC CYCLIC OPERATION SYSTEM, HOMOMORPHIC CYCLIC OPERATION APPARATUS, HOMOMORPHIC CYCLIC OPERATION METHOD, AND HOMOMORPHIC CYCLIC OPERATION PROGRAM

This application is a National Stage Entry of PCT/JP2021/028209 filed on Jul. 29, 2021, the contents of all of which are incorporated herein by reference, in their entirety.

FIELD

Field

The present invention relates to a homomorphic cyclic operation system, homomorphic cyclic operation apparatus, homomorphic cyclic operation method, and homomorphic cyclic operation program.

Background

Homomorphic encryption is a cryptographic technique. When ciphertexts $Enc(m_1)$, $Enc(m_2)$ of plaintexts $m_1$, $m_2$ are given, homomorphic encryption allows a ciphertext $Enc(m_1 \circ m_2)$ of a binary operation $m_1 \circ m_2$ of the plaintexts $m_1$, $m_2$ to be computed without the ciphertext $Enc(m_1 \circ m_2)$ being decrypted back into the plaintexts $m_1$, $m_2$. Here, "$\circ$" is a binary operation such as addition "+" or multiplication "×." Homomorphic encryption related to addition "+" is called additive homomorphic encryption. Further, homomorphic encryption that is also homomorphic unlimitedly with respect to multiplication "×" is called fully homomorphic encryption.

Fully homomorphic encryption has the best properties because it is homomorphic unlimitedly with respect to both addition and multiplication. However, fully homomorphic encryption presents difficulties in practical use as it requires a large amount of computation. Therefore, homomorphic encryptions with intermediate properties between additive and fully homomorphic encryptions have also been developed. For instance, a cryptosystem called somewhat homomorphic encryption is an encryption scheme homomorphic with respect to a finite number of additions and multiplications (for instance, refer to Non-Patent Literature 1).

Non-Patent Literature 1

Yasuda M., Shimoyama T., Kogure J., Yokoyama K., Koshiba T. (2013) "Packed Homomorphic Encryption Based on Ideal Lattices and Its Application to Biometrics," In: Cuzzocrea A., Kittl C., Simos D. E., Weippl E., Xu L. (eds), Security Engineering and Intelligence Informatics, CD-ARES 2013, Lecture Notes in Computer Science, vol 8128, Springer, Berlin, Heidelberg.

SUMMARY

The disclosure of the literature in Citation List above is incorporated herein in its entirety by reference thereto. The following analysis is given by the present inventors.

In a real computer system, it is common to provide not only addition and multiplication but also other frequently used operations. This is because it is more convenient to provide a user with a predetermined operation as a protocol than to provide an operation that can theoretically be achieved by a combination of addition and multiplication. An example of such an operation is a cyclic operation. The cyclic operation moves storage locations of a periodic array of data while maintaining the order of the data array. The operation that moves storage locations while maintaining the order of data is generally referred to as a shift, and the cyclic operation shifts a periodic array.

It goes without saying that, performing a cyclic operation in a homomorphic encryption system requires not only simply implementing the cyclic operation but also shifting the storage locations of data without decrypting a periodic array of the encrypted data. Moreover, to implement a cyclic operation in homomorphic encryption, it is also necessary to address the computational cost, which is a problem unique to homomorphic encryption.

In view of the problem above, it is an object of the present invention to provide a homomorphic cyclic operation system, homomorphic cyclic operation apparatus, homomorphic cyclic operation method, and homomorphic cyclic operation program that shift data storage locations without decrypting a periodic array of encrypted data.

According to a first aspect of the present invention, there is provided a homomorphic cyclic operation system performing a homomorphic cyclic operation on a periodic array of data using homomorphic encryption having a homomorphic operation defined with respect to at least one multiplication, the homomorphic cyclic operation system comprising: an encryption apparatus that encrypts the periodic array of data by storing it in the coefficients of an indeterminate polynomial to generate a ciphertext of periodic data; and a homomorphic cyclic operation apparatus that shifts the periodic array of data in the ciphertext of the periodic data by applying the indeterminate raised to the power of a shift amount to the ciphertext of the periodic data.

According to a second aspect of the present invention, there is provided a homomorphic cyclic operation apparatus performing a homomorphic cyclic operation on a periodic array of data using homomorphic encryption having a homomorphic operation defined with respect to at least one multiplication, wherein the homomorphic cyclic operation apparatus shifts the periodic array of data in a ciphertext of the periodic data by encrypting the periodic array of data by storing it in the coefficients of an indeterminate polynomial to generate the ciphertext and applying the indeterminate raised to the power of a shift amount to the ciphertext.

According to a third aspect of the present invention, there is provided a homomorphic cyclic operation method performing a homomorphic cyclic operation on a periodic array of data using homomorphic encryption having a homomorphic operation defined with respect to at least one multiplication, the homomorphic cyclic operation method comprising: a step of encrypting the periodic array of data by storing it in the coefficients of an indeterminate polynomial to generate a ciphertext of periodic data; and a step of shifting the periodic array of data in the ciphertext of the periodic data by applying the indeterminate raised to the power of a shift amount to the ciphertext of the periodic data.

According to a fourth aspect of the present invention, there is provided a program causing a computer to perform a homomorphic cyclic operation on a periodic array of data using homomorphic encryption having a homomorphic operation defined with respect to at least one multiplication, wherein the program shifts the periodic array of data in a ciphertext of the periodic data by applying the indeterminate raised to the power of a shift amount to the ciphertext, wherein the ciphertext of the periodic data is encrypted by storing it in the coefficients of an indeterminate polynomial. Further, this program can be stored in a computer-readable storage medium. The storage medium may be a non-transitory one such as a semiconductor memory, a hard disk, a magnetic recording medium, an optical recording medium, and the like. The present invention can also be realized as a computer program product.

According to each aspect of the present invention, it becomes possible to provide a homomorphic cyclic operation system, homomorphic cyclic operation apparatus, homomorphic cyclic operation method, and homomorphic cyclic operation program that shift data storage locations without decrypting a periodic array of encrypted data.

BRIEF DESCRIPTION OF THE DRAWINGS

FIG. 11 is a drawing illustrating a concept of securely calculating similarity between heterocyclic compounds.

Figure 12:
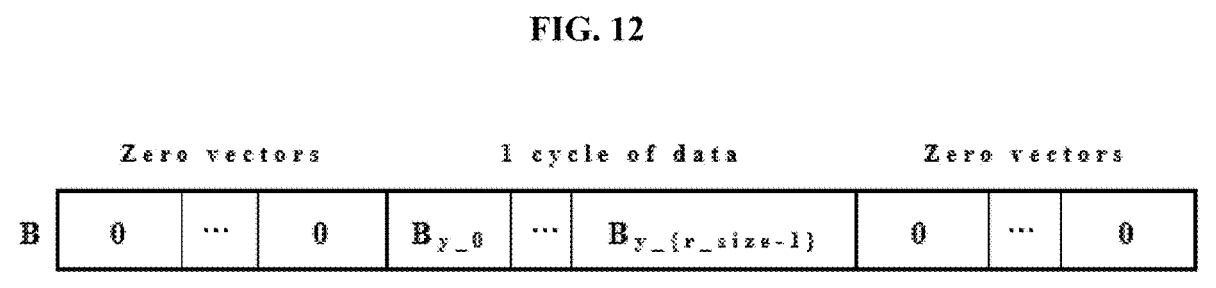

FIG. 12 is a drawing illustrating a concept of securely calculating similarity between heterocyclic compounds.

EXAMPLE EMBODIMENTS

Example embodiments of the present invention will be described with reference to the drawings. The present invention, however, is not limited to the example embodiments described below. Further, in each drawing, the same or corresponding elements are appropriately designated by the same reference signs. It should also be noted that the drawings are schematic, and the dimensional relationships and the ratios between the elements may differ from the actual ones. The dimensional relationships and the ratios between drawings may also be different in some sections.

First Example Embodiment

Figure 1:
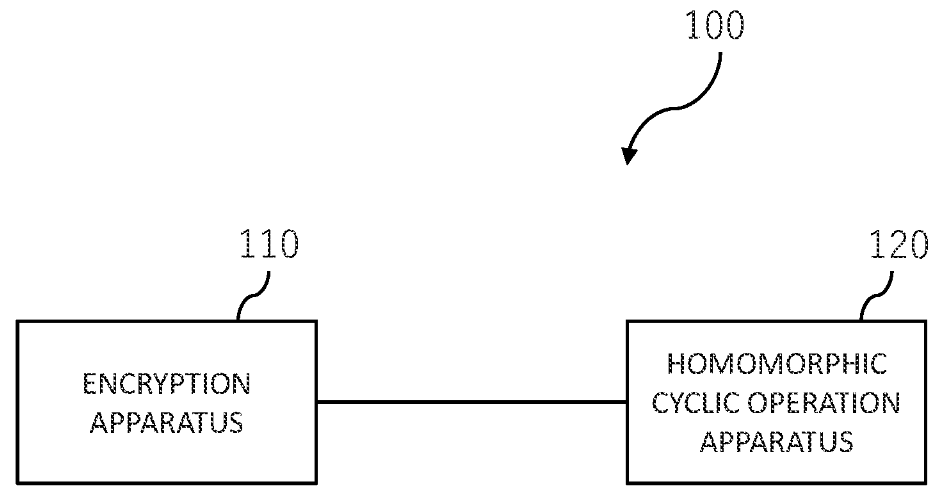
FIG. 1 is a block diagram showing a schematic configuration example of a homomorphic cyclic operation system in a first example embodiment.
Figure 2:
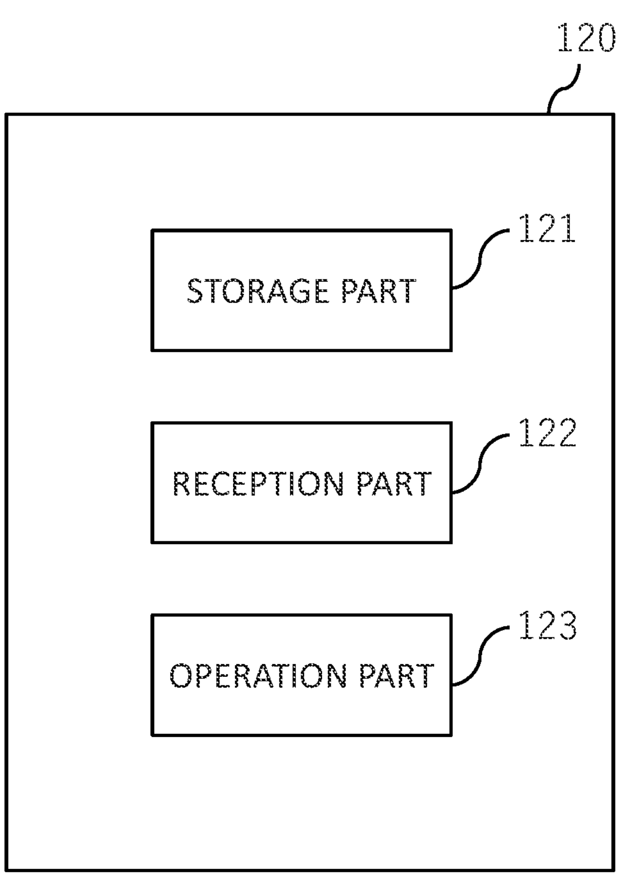
FIG. 2 is a block diagram showing a schematic configuration example of a homomorphic cyclic operation apparatus in the first example embodiment.

The following describes a homomorphic cyclic operation system relating to a first example embodiment with reference to FIGS. 1 and 2. In the first example embodiment, only the basic concept of the present invention is described.

FIG. 1 is a block diagram showing a schematic configuration example of the homomorphic cyclic operation system in the first example embodiment. As shown in FIG. 1, the homomorphic cyclic operation system 100 relating to the first example embodiment comprises an encryption apparatus 110 and a homomorphic cyclic operation apparatus 120. The encryption apparatus 110 and the homomorphic cyclic operation apparatus 120 are information processing apparatuses (computers), the hardware configuration of which will be described using an example later. The encryption apparatus 110 and the homomorphic cyclic operation apparatus 120 may be connected by wired or wireless communication. For instance, the encryption apparatus 110 may be a general-purpose personal computer or a mobile terminal such as a smartphone.

The homomorphic cyclic operation system 100 relating to the first example embodiment shown in FIG. 1 performs a cyclic operation on a periodic array of data using homomorphic encryption capable of encrypting a data array and having a homomorphic operation defined with respect to at least one multiplication. The encryption apparatus 110 encrypts the periodic array of data by storing it in the coefficients of an indeterminate polynomial to generate a ciphertext of periodic data, and the homomorphic cyclic operation apparatus 120 shifts the periodic array of data in the ciphertext of the periodic data by applying the indeterminate raised to the power of a shift amount to the ciphertext of the periodic data.

Further, the homomorphic cyclic operation apparatus 120 shifts the periodic array of data without decrypting it. Therefore, an output of the homomorphic cyclic operation apparatus 120 is also a ciphertext. There are various ways to use the obtained ciphertext, as illustrated by the example embodiments below. It is preferred that a decryption apparatus for decrypting the obtained ciphertext be provided separately from the homomorphic cyclic operation apparatus 120 because the secret and public keys of homomorphic encryption can be managed separately by different apparatuses with increased security.

The homomorphic encryption used in the first example embodiment can encrypt a data array and has a homomorphic operation defined with respect to at least one multiplication. Further, it is preferable that homomorphic operations be also defined for addition, although it is not directly used in the example embodiment. In other words, in the homomorphic encryption used in the first example embodiment, homomorphic addition and homomorphic multiplication that satisfy the following relational expressions are defined:

Homomorphic Addition $$\mathrm{HomAdd}(\mathrm{Enc}(m),\mathrm{Enc}(m'))=\mathrm{Enc}(m+m')$$

Homomorphic Multiplication $$\mathrm{HomMul}(\mathrm{Enc}(m),\mathrm{Enc}(m'))=\mathrm{Enc}(m*m')$$

FIG. 2 is a block diagram showing a schematic configuration example of the homomorphic cyclic operation apparatus in the first example embodiment. As shown in FIG. 2, the homomorphic cyclic operation apparatus 120 comprises a storage part 121, a reception part 122, and an operation part 123. The storage part 121 stores homomorphic cyclic operations and various information used in connection with the homomorphic cyclic operations. The reception part 122 receives a ciphertext of periodic data from the encryption apparatus 110. The operation part 123 uses the homomorphic operations above to perform a cyclic operation without decrypting the ciphertext of the periodic data.

Figure 3:
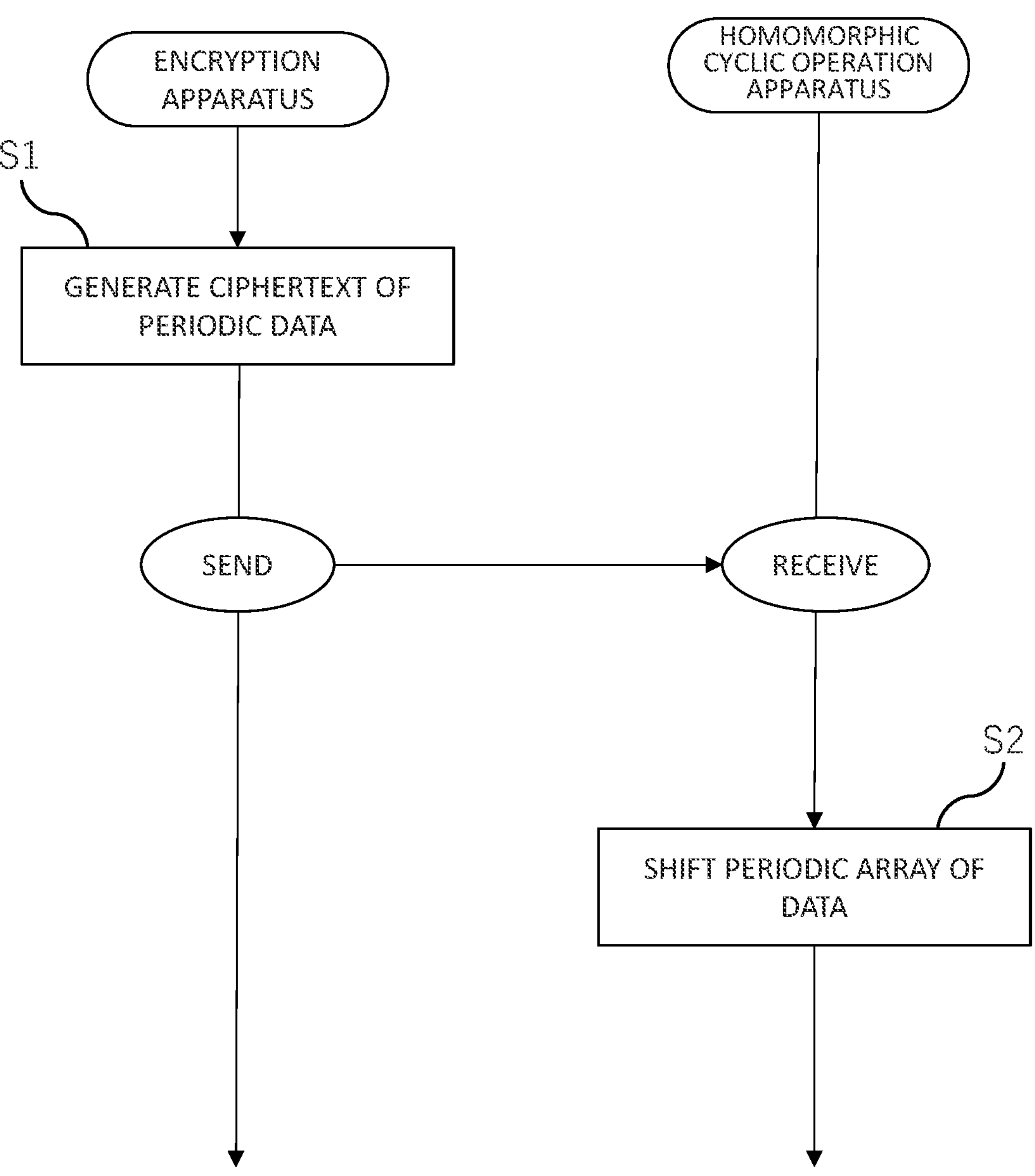
FIG. 3 is a system flowchart of the system in the first example embodiment.

Next, with reference to FIG. 3, processes between the encryption apparatus 110 and the homomorphic cyclic operation apparatus 120 will be described. FIG. 3 is a system flowchart of the system in the first example embodiment. The system flowchart in FIG. 3 shows the procedure of a homomorphic cyclic operation method for performing a homomorphic cyclic operation on a periodic array of data using homomorphic encryption capable of encrypting a data array and having a homomorphic operation defined with respect to at least one multiplication.

In step S1, the encryption apparatus 110 encrypts a periodic array of data by storing it in the coefficients of an indeterminate polynomial to generate a ciphertext of periodic data. The encryption apparatus 110 transmits the generated ciphertext of the period data to the homomorphic cyclic operation apparatus 120.

In step S2, the homomorphic cyclic operation apparatus 120 shifts the periodic array of data in the ciphertext of the periodic data by applying the indeterminate raised to the power of a shift amount to the ciphertext of the periodic data received from the encryption apparatus 110.

There are various ways of using the ciphertext obtained in the step S2, as illustrated by the example embodiments below.

[Hardware Configuration]

Figure 4:
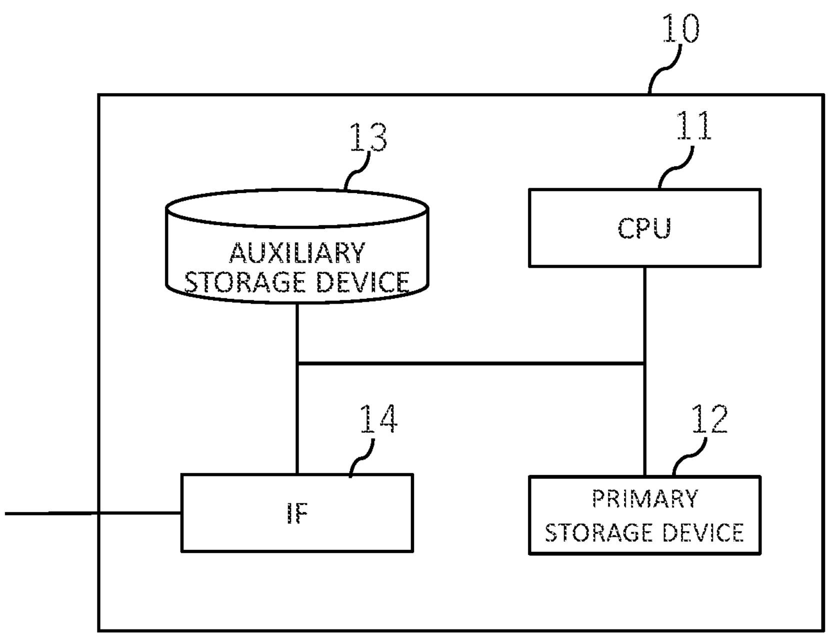
FIG. 4 is a drawing showing an example of the hardware configuration of the homomorphic cyclic operation apparatus.

FIG. 4 is a drawing showing an example of the hardware configuration of the homomorphic cyclic operation apparatus. In other words, the hardware configuration shown in FIG. 4 is an example of the hardware configuration of the homomorphic cyclic operation apparatus 120.

An information processing apparatus (computer) employing the hardware configuration shown in FIG. 4 can achieve the functions of the homomorphic cyclic operation apparatus 120 by executing the homomorphic cyclic operation method described above as a program. It should be noted that the hardware configuration example shown in FIG. 4 is merely an example of the hardware configuration that achieves the functions of the homomorphic cyclic operation apparatus 120 and is not intended to limit the hardware configuration of the homomorphic cyclic operation apparatus 120. The homomorphic cyclic operation apparatus 120 may include hardware not shown in FIG. 4.

As shown in FIG. 4, the hardware configuration 10 that may be employed by the homomorphic cyclic operation apparatus 120 comprises a CPU (Central Processing Unit) 11, a primary storage device 12, an auxiliary storage device 13, and an IF (interface) part 14, which are connected to each other by, for instance, an internal bus.

The CPU 11 executes each instruction included in the homomorphic cyclic operation program executed by the homomorphic cyclic operation apparatus 120. The primary storage device 12 is, for instance, a RAM (Random Access Memory) and temporarily stores various programs such as the homomorphic cyclic operation program executed by the homomorphic cyclic operation apparatus 120 so that the CPU 11 can process the programs.

The auxiliary storage device 13 is, for instance, an HDD (Hard Disk Drive) and is capable of storing the various programs, such as the homomorphic cyclic operation program executed by the homomorphic cyclic operation apparatus 120, in the medium to long term. The various programs such as the homomorphic cyclic operation program may be provided as a program product stored in a non-transitory computer-readable storage medium. The auxiliary storage device 13 can be used to store the various programs such as the homomorphic cyclic operation program stored in the non-transitory computer-readable storage medium in the medium to long term. The IF part 14 provides an interface to the input and output between, for instance, the homomorphic cyclic operation apparatus 120 and the encryption apparatus 110.

The information processing apparatus employing the hardware configuration 10 described above achieves the functions of the homomorphic cyclic operation apparatus 120 by executing the homomorphic cyclic operation method described above as a program.

The homomorphic cyclic operation system in the first example embodiment is thus able to contribute to shifting data storage locations without decrypting a periodic array of encrypted data. Further, the homomorphic cyclic operation system in the first example embodiment can be implemented as a homomorphic cyclic operation method, and the homomorphic cyclic operation method in the first example embodiment can be implemented as a program executed by an information processing apparatus (computer) having the hardware configuration described above.

Second Example Embodiment

The following describes a homomorphic cyclic operation system relating to a second example embodiment. The second example embodiment describes a method for performing a homomorphic cyclic operation on a periodic array of data while using an example of the homomorphic encryption used in the first example embodiment. The homomorphic encryption described below is capable of encrypting a data array and has a homomorphic operation defined with respect to at least one multiplication.

First, one cycle of a periodic array of data can be regarded as a vector. Then, a vector $a=(a_0, a_1, \ldots, a_{n-1})$ and a polynomial $a(x)=\Sigma_{i=o}^{n-1} a_i*x^i$ can be equated. For the vector $a=(a_0, a_1, \ldots, a_{n-1})$ and a vector $b=(b_0, b_1, \ldots, b_{n-1})$, this equation results in defining a multiplication $a(x)*b(x)$ as a polynomial and an inner product $<a, b>=\Sigma_{i=0}^{n-1} a_i*b_i$ as a vector.

Then, a noise vector $u=(u_0, u_1, \ldots, u_{n-1})$ is prepared. $u_i$ $(i=0, 1, \ldots, n-1)$ is one of $\{0, 1, -1\}$. The probability of $u_i=0$ is q, the probability of $u_i=1$ is $(1-q)/2$, and the probability of $u_i=-1$ is $(1-q)/2$.

Using this noise vector $u=(u_0, u_1, \ldots, u_{n-1})$, a ciphertext of a plaintext vector $m=(m_0, m_1, \ldots, m_{n-1})$ is defined as follows:

$$Enc(m) = \left[\sum_{i=0}^{n-1}(m_i + t*u_i)*r^i\right]_d \quad \text{[Math. 1]}$$

Note that, in the above definition of the ciphertext, t is the plaintext space size, d is the ciphertext space size, and r is the base that satisfies $r^n=-1 \bmod d$. Further, $[\ ]_d$ is a reduction to an interval $[-d/2, d/2)$, that is, a reduction such that the remainder when divided by d is included in the interval $[-d/2, d/2)$.

If the noise vector $u=(u_0, u_1, \ldots, u_{n-1})$ and the plaintext vector $m=(m_0, m_1, \ldots, m_{n-1})$ are respectively regarded as a polynomial $u(x)=\Sigma_{i=0}^{n-1} u_i*x^i$ and a polynomial $m(x)=\Sigma_{i=0}^{n-1} m_i*x^i$, the ciphertext above can be expressed as follows:

$$Enc(m(x)) = [m(r) + t*u(r)]_d \quad \text{[Math. 2]}$$

Next, we will demonstrate the ciphertext defined as above is homomorphic encryption.

Homomorphic Addition

For ciphertexts $Enc(m(x))$ and $Enc(m'(x))$ of the plaintext vectors $m(x)$ and $m'(x)$ expressed as polynomials, additive homomorphism holds as shown below.

$$[Enc(m(x))+Enc(m'(x))]_d=[[m(r)+t^*u(r)]_d+[m'(r)+t^*u'(r)]_d]_d=$$
$$[[m(r)+m'(r)+t^*(u'(r))]_d=Enc(m(x)+m'(x)\bmod t)$$

Here, note that mod t is absorbed by t*(u(r)+u'(r)) when each coefficient of m(r)+m(r) becomes larger than t.

Homomorphic Multiplication

For the ciphertexts Enc(m(x)) and Enc(m'(x)) of the plaintext vectors m(x) and m'(x) expressed as polynomials, multiplicative homomorphism holds as shown below.

$$[Enc(m(x))^*Enc(m'(x))]_d=$$
$$[[m(r)+t^*u(r)]_d{}^*[m'(r)+t^*u'(r)]_d]_d=[(m(r)+t^*u(r))^*(m'(r)+t^*u'(r))]_d=$$
$$[m(r)^*m'(r)+t^*(m(r)^*u'(r)+m'(r)^*u(r)+t^*u(r)^*u'(r))]_d=$$
$$[m(r)^*m'(r)+t^*u''(r)\bmod r^n+1]_d=Enc(m(x)^*m'(x)\bmod (t,x^n+1))$$

Note that, as a transformation of the above, u"(r)=m(r)*u'(r)+m'(r)*u(r)+t*u(r)*u'(r). Also note that $r^n=-1$ mod d. Further, f(x) mod (t, $x^n+1$) represents f(x) mod t mod ($x^n+1$). In other words, f(x) is converted to a polynomial f'(x) of a degree smaller than n using the relationship $x^n=-1$, and f(x) mod t mod ($x^n+1$) is a polynomial of the remainders obtained by dividing the coefficients of f'(x) by t.

Homomorphic Inner Product

For the plaintext vector m=($m_0$, $m_1$, . . . , $m_{n-1}$), an inner product vector m2=($m2_0$, $m2_1$, . . . , $m2_{n-1}$)=($m_0$, $-m_{n-1}$, $-m_{n-2}$, . . . , $-m_1$) is prepared. An inner product ciphertext Enc2(m) is defined as Enc(m2), and a polynomial having the inner product vector m2 as a coefficient is defined as m2(x). At this time, for the ciphertext Enc(m(x)) of the plaintext vector m(x) expressed as a polynomial and an inner product ciphertext Enc2(m'(x)) of the plaintext vector m'(x), the following holds true:

$$HomMul(Enc(m(x)),Enc2(m'(x)))=$$
$$Enc\left(m(x)^*m2'(x)\bmod\left(t,x^{n+1}\right)\right)=Enc(<m,m'>+m''(x)\bmod t)$$

This is because, if we note that $x^n=-1$, $\Sigma_{i=1}^{n-1}-m_i{}^*m'_i{}^*x^n=\Sigma_{i=1}^{n-1}m_i{}^*m'_i$, so the following computation holds true:

$$m(x)=m_0+m_1{}^*x+m_2{}^*x^2+\ldots+m_{n-1}{}^*x^{n-1}\times m2'(x)=$$
$$m'_0-m'_1{}^*x^{n-1}-m'_2{}^*x^{n-2}-\ldots-m'_{n-1}{}^*x^J=m_0{}^*m'_0+\sum_{i=1}^{n-1}-$$
$$m_i{}^*m'_i{}^*x^n+m''(x)=\sum_{i=0}^{n-1}m_i{}^*m'_i+m''(x)=<m,m'>+m''(x)$$

The Homomorphic operations above enable shifting the periodic array of data in the ciphertext Enc(m(x)) of the periodic data m(x) by homomorphically multiplying Enc($x^s$) obtained by encrypting the indeterminate x raised to the power of a shift amount s, i.e., $x^s$, by the ciphertext Enc(m(x)) of the periodic data m(x). This is because the following relational expression holds true:

$$HomMul(Enc(m(x)),Enc(x^s))=$$
$$Enc\left(m(x)^*x^s\bmod\left(t,x^{n+1}\right)\right)=Enc((m\gg\_s)\bmod t)$$

Note that, in the above equation, >>_ represents a negative cyclic operation (cyclic operation that multiplies the data by −1 when performing a shift) that shifts the vector to the right. In other words, when the ciphertext of the plaintext vector m=($m_0$, $m_1$, . . . , $m_{n-1}$) is Enc(m) and the shift amount is s, a ciphertext HomCycle(Enc (m), s) after the shifting is obtained as follows in the above homomorphic cyclic operation:

$$HomCycle(Enc(m),s)=Enc((-m_{n-s},\ldots,-m_{n-1},m_0,\ldots,m_{n-1-s}))$$

Note that, in the homomorphic cyclic operation above, the data is multiplied by −1 during the shifting, but as can be seen from the example embodiments described later, there is no problem in practical use. Further, the homomorphic cyclic operation described above in combination with the homomorphic cyclic operation system, the homomorphic cyclic operation apparatus, the homomorphic cyclic operation method, and the homomorphic cyclic operation program of the first example embodiment realize the homomorphic cyclic operation system, a homomorphic cyclic operation apparatus, a homomorphic cyclic operation method, and a homomorphic cyclic operation program of the second example embodiment.

Third Example Embodiment

The following describes an improvement on the homomorphic cyclic operation in the second example embodiment. Since a homomorphic cyclic operation in a third example embodiment can use homomorphic operations different from the encryption and the homomorphic cyclic operation in the second embodiment, the following description of the third example embodiment only discusses the homomorphic cyclic operation in the third example embodiment.

The homomorphic cyclic operation in the third example embodiment shifts the periodic array of data in the ciphertext Enc(m(x)) of the periodic data m(x) by scalar multiplying the ciphertext Enc(m(x)) of the periodic data m(x) by a value obtained by substituting the base r for the indeterminate x raised to the power of the shift amount s, i.e., $r^s$.

More concretely, for the ciphertext Enc(m(x)) of the plaintext m(x) expressed as a polynomial, the homomorphic cyclic operation with the shift amount s can be computed as follows. Note that, as a transformation of the below, u'(r))=u(r)*$r^s$.

$$[Enc(m(x))^*r^s]_d=[[m(r)+t^*u(r)]_d{}^*r^s]_d=$$
$$[m(r)^*r^s+t^*u(r)^*r^s]_d=\left[m_0{}^*r^s+m_1{}^*r^{1+s}+\ldots+m_{n-1}{}^*r^{n-1+s}+t^*u'(r)\right]_d=$$
$$\left[-m_{n-s}+(-m_{n-s+1})^*r+\ldots+(-m_{n-1})^*r^{s-1}+m_0{}^*r^s+m_1{}^*r^{s+1}+\ldots+m_{n-s-1}{}^*r^{n-1}+t^*u'(r)\right]_d=$$
$$Enc((m\gg\_s)\bmod t)$$

Note that, since $r^{-1}=-r^{n-1}$ mod d from $r^n\equiv-1$ mod d, if the shift amount s is negative, the cyclic operation is negative with a shift to the left.

The following describes the difference between the homomorphic cyclic operation in the second example embodiment and that in the third example embodiment.

Since the homomorphic cyclic operation in the second example embodiment computes HomMul(Enc(m(x)), Enc($x^s$)), Enc($x^s$) needs to be stored or computed every time. Meanwhile, since $r^i$ used in the homomorphic cyclic operation in the third example embodiment is also used in the encryption, it is often computed in advance and the computation result is stored in memory. In this case, no additional storage and computational costs are incurred because the computed $r^i$ can be reused.

Moreover, even if one ends up having to compute $r^i$ used in the homomorphic cyclic operation in the third example embodiment because it cannot be reused, the cost of computing $r^i$ is smaller than the cost of computing Enc($x^s$). This is because $r^i$ is included in the definition of the encryption $Enc(m)=[\Sigma_{i=0}^{n-1}(m_i+t*u_i)*r^i]_d$.

Further, the homomorphic cyclic operation in the second example embodiment brings about an increase in noise that may cause a decoding error when the homomorphic multiplication HomMul is used. Here, the increase in noise means an increased absolute value of the coefficient of the polynomial u(x) corresponding to u(r) in the ciphertext $Enc(m(x))=[m(r)+t*u(r)]_d$. Meanwhile, in the homomorphic cyclic operation in the third example embodiment, the noise after the homomorphic cyclic operation is $u'(r)=u(r)*r^s$, which is a polynomial having the corresponding u>>_s as a coefficient. Although the signs of the shifted elements are inverted, the absolute value of the coefficient remains the same. Therefore, no increase in noise occurs.

In other words, as compared with the homomorphic cyclic operation in the second example embodiment, the homomorphic cyclic operation in the third example embodiment has the advantage of having a lower additional memory or computational cost and a lower overall cryptographic computational cost stemming from an increased decoding error probability or larger encryption scheme parameters to address it.

Further, the homomorphic cyclic operation in the third example embodiment in combination with the homomorphic cyclic operation system, the homomorphic cyclic operation apparatus, the homomorphic cyclic operation method, and the homomorphic cyclic operation program of the first example embodiment are also able to realize a homomorphic cyclic operation system, a homomorphic cyclic operation apparatus, a homomorphic cyclic operation method, and a homomorphic cyclic operation program of the third example embodiment.

Fourth Example Embodiment

The homomorphic cyclic operation described above is a negative cyclic operation that multiplies the data by −1 when performing a shift. Using similarity calculation as an example, the fourth example embodiment describes how even the negative cyclic operation that multiplies the data by −1 when performing a shift can be put to practical use with some ingenuity. Even the negative cyclic operation that multiplies data by −1 when performing a shift by encrypting a periodic array of data by storing it in the coefficients of an indeterminate polynomial after making the periodic array of data periodically redundant is able to calculate similarity accurately.

Figure 5:
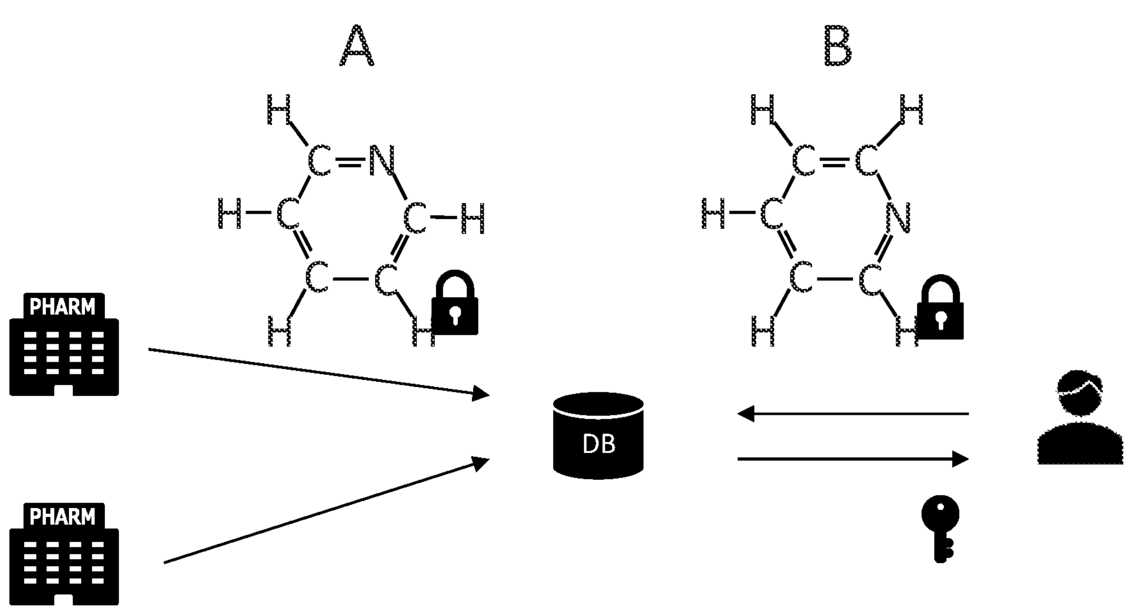
FIG. 5 is a drawing illustrating a concept of securely calculating similarity between heterocyclic compounds.

FIG. 5 is a drawing illustrating a concept of securely calculating similarity between heterocyclic compounds. FIG. 5 assumes that there is a database in which the structure of a heterocyclic compound A is encrypted and registered by a plurality of pharmaceutical companies. Then, let's say a user wants to know how similar a heterocyclic compound B discovered by the user is to previously registered heterocyclic compounds. We will assume that the similarity between heterocyclic compounds is determined by the associations between atoms contained in heterocyclic compounds, for instance, as shown in the score table below.

TABLE 1

| | | Heterocyclic Compound B | | |
|---|---|---|---|---|
| | | C—H | C—OH | N |
| Heterocyclic Compound A | C—H | +5 | +1 | +0 |
| | C—OH | +1 | +5 | +0 |
| | N | +0 | +0 | +10 |

Then, one can calculate the similarity applying an inner product operation to the score table. For instance, in the example shown in FIG. 5, rows in the score table are selected according to the atoms contained in the heterocyclic compound A, and an array A is created in which the selected rows of the score table are connected in a line. Here, we will sequentially connect them from the top left clockwise. For the other heterocyclic compound B, an array B is created by assigning 1 to matches and 0 to non-matches according to the atoms contained in the heterocyclic compound B. We will sequentially connect them from the top left clockwise, as with the array A.

Figure 6:
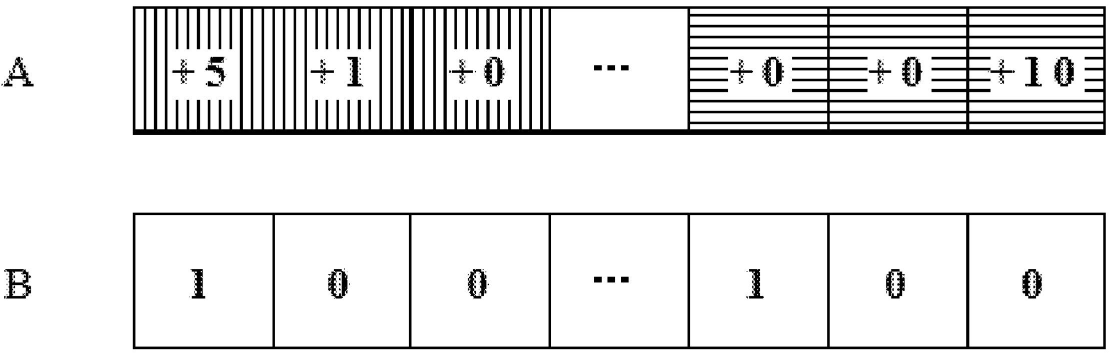
FIG. 6 is a drawing illustrating a concept of securely calculating similarity between heterocyclic compounds.

The similarity can be calculated by performing an inner product operation on these two arrays A and B as vectors. Since the inner product operation here can use a homomorphic operation as explained above, one can calculate the similarity while keeping the structures of the heterocyclic compounds A and B secret. See FIG. 6.

Meanwhile, since heterocyclic compounds are cyclically structured, the value of the similarity between two given compounds changes depending on the starting point from which the similarity calculation is performed. As a matter of fact, although the heterocyclic compounds A and B are the same heterocyclic compounds, the calculated similarity above is low because the starting points of their cyclic structures are different. Without a homomorphic cyclic operation, it is necessary to repeatedly encrypt the data of the heterocyclic compounds as many times as the number of possible combinations of the starting points of the cyclic structures. A homomorphic cyclic operation enables changing the starting point in an encrypted state after the starting point of a cyclic structure is set to any one point and the data is encrypted.

Since the homomorphic cyclic operation described above, however, is a negative cyclic operation that multiplies the data by −1 when performing a shift, problems arise in the following two cases:

Case 1: If the dimensionality of a plaintext handled by somewhat homomorphic encryption is different from the length of the vector to be encrypted, a shift cannot be performed.

Figure 7:
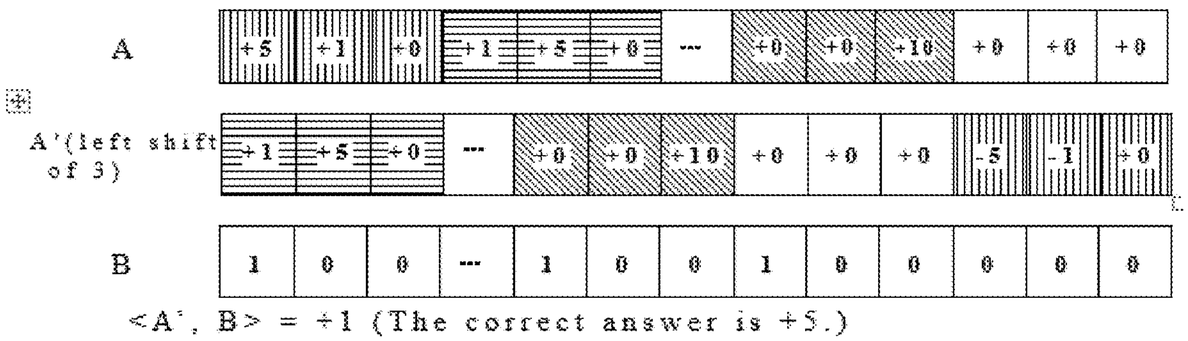
FIG. 7 is a drawing illustrating a concept of securely calculating similarity between heterocyclic compounds.

For instance, as shown in FIG. 7, when the dimensionality of a plaintext handled by homomorphic encryption differs from the length of the vector to be encrypted, the remaining dimensions are filled with zeros. In this case, the correct result cannot be obtained from a homomorphic inner product operation.

Case 2: Even when the dimensionality of a plaintext handled by somewhat homomorphic encryption is the same as the length of the vector to be encrypted, a value obtained from multiplication by −1 is used for calculation since a negative shift is performed.

Figure 8:
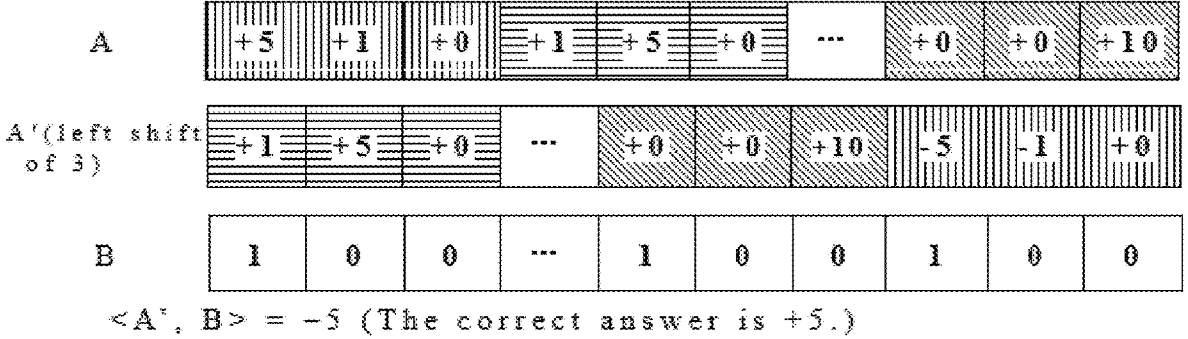
FIG. 8 is a drawing illustrating a concept of securely calculating similarity between heterocyclic compounds.

For instance, as shown in FIG. 8, even if the dimensionality of a plaintext handled by homomorphic encryption is the same as the length of the vector to be encrypted, a value obtained from multiplication by −1 is used for calculation since a negative shift is performed. As a result, the correct result cannot be obtained from a homomorphic inner product operation.

Figure 9:
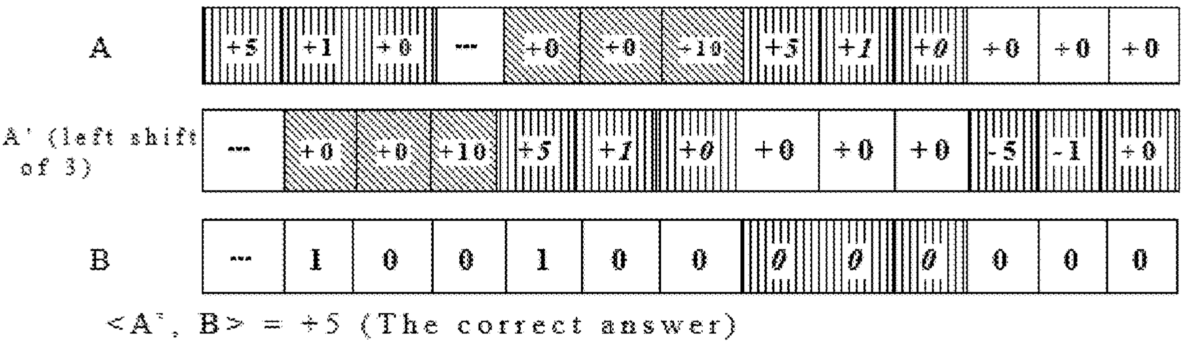
FIG. 9 is a drawing illustrating a concept of securely calculating similarity between heterocyclic compounds.

Therefore, the homomorphic cyclic operation of the fourth example embodiment encrypts a periodic array of data by storing it in the coefficients of an indeterminate polynomial after making the periodic array of data periodically redundant. As a result, the homomorphic cyclic operation of the fourth example embodiment is able to accurately perform a homomorphic inner product operation, even if it is a negative cyclic operation that multiplies the data by −1 when performing a shift, thereby being able to accurately calculate similarity. Further, as can be seen from the example in FIG. 9, the portions of the other vector that correspond to the periodically redundant portions are filled with zeros. Note that the redundant portions are indicated by italic numbers.

Figure 10:
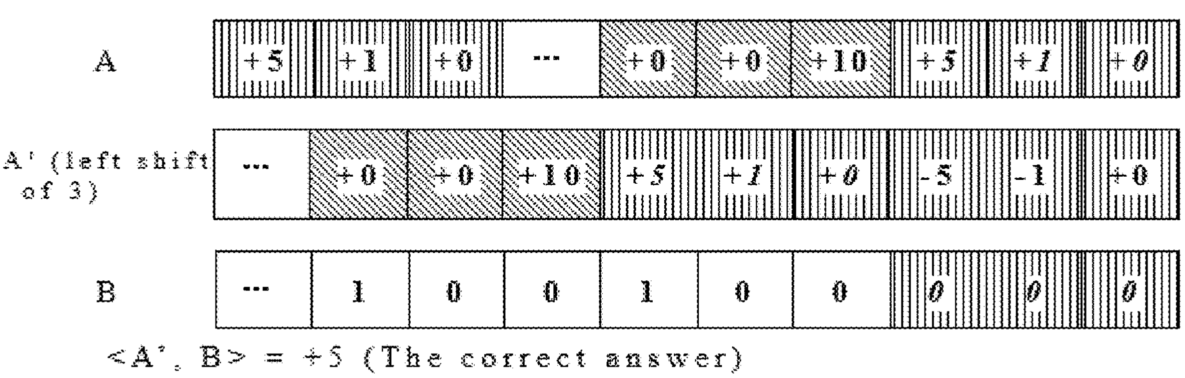
FIG. 10 is a drawing illustrating a concept of securely calculating similarity between heterocyclic compounds.

Further, even when the dimensionality of a plaintext handled by homomorphic encryption is the same as the length of the vector to be encrypted, by encrypting a periodic array of data by storing it in the coefficients of an indeterminate polynomial after making the periodic array of data periodically redundant, even a negative cyclic operation that multiplies the data by −1 when performing a shift can accurately perform a homomorphic inner product operation, thereby being able to accurately calculate similarity. See FIG. 10.

The following describes in more detail the homomorphic cyclic operation of the fourth example embodiment. The description below refers to the encryption apparatus 110 and the homomorphic cyclic operation apparatus 120 discussed in the description of the first example embodiment, however, the apparatus configuration is not necessarily limited thereto.

Premise

First, as a premise, each element is encoded using 0 to 1-1. The size of the score space is $s_{size}$, and the length of the periodic array of data is $r_{size}$. The cyclic operation here allows both left and right shifts, the amount of a left shift is set to $s_i$, and the amount of a right shift $s_r$. Further, the i-th row of the score table below is regarded as a vector $T_{i.}$

TABLE 2

| | | 0 | 1 | ... | l − 1 |
|---|---|---|---|---|---|
| $T_0$ | 0 | $t_{0,0}$ | $t_{1,0}$ | ... | $t_{l-1,0}$ |
| T1 | 1 | $t_{0,0}$ | $t_{1,1}$ | ... | $t_{l-1,1}$ |
| | . | . | . | | . |
| | . | . | . | ⋱ | . |
| | . | . | . | | . |
| $T_{l-1}$ | l − 1 | $t_{l-1,0}$ | $t_{l-1,1}$ | ... | $t_{l-1,l-1}$ |

Setup

Taking a security parameter as an input, generate a public key pk and a secret key sk for a somewhat homomorphic encryption scheme that can treat an n−1 degree polynomial having a coefficient space size $s>s_{size}$ as a plaintext, where $n\geq(r_{size}+s_l+s_r)\times 1$. Here, $s>s_{size}$ signifies the ability to handle all potential scores that may be outputted. Further, the condition $n\geq(r_{size}+s_l+s_r)\times 1$ is required to encrypt the length of a vector to be encrypted.

Registration

In the registration phase, with the public key pk and a periodic array (vector) of data $x=(x_0, x_1, \ldots, x_{r\_size-1})$ as inputs, the following computation is performed. Note that, although this process is typically performed by the encryption apparatus 110, the apparatus used is not limited as long as the process can be registered in the homomorphic cyclic operation apparatus 120 in advance.

Figure 11:
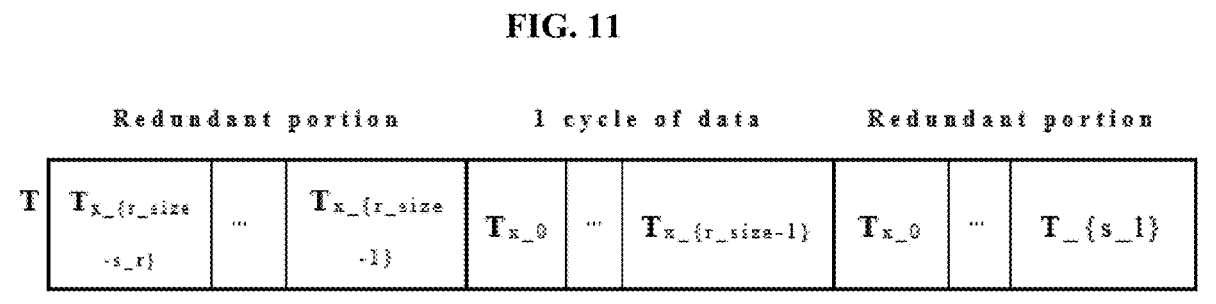

1. A vector obtained by making the periodic array (vector) of data x redundant is denoted as $x'=(x_{r\_size-s\_r}, \ldots, x_{r\_size-1}, x_0, \ldots, x_{r\_size-1}, x_0, \ldots, x_{s\_1})$.
2. A vector formed by concatenating the row vectors corresponding to each element of the vector x' in the score table is denoted as $T=(T_{x\_\{r\_size-s\_r\}}, \ldots, T_{x\_\{r\_size-1\}}, T_{x\_0}, \ldots, T_{x\_\{r\_size-1\}}, T_{x\_0}, \ldots, T_{x\_\{s\_1\}})$ (refer to FIG. 11).
3. Calculate and output $c_1=\mathrm{Enc}(T)$.

Query

In the query phase, the encryption apparatus 110 takes the public key pk and a periodic array (vector) of data $y=(y_0, y_1, \ldots, y_{r\_size-1})$ as inputs and performs the following computation:

1. A vector B is formed by concatenating vectors where only the dimension of the value of each element of the vector y is 1 and the rest are zero. B is defined as $B=(B_{y\_0}, \ldots, B_{y\_\{r\_size-1\}})$, $B_i=(b_0, b_1, \ldots, b_{l-1})$ where $b_j=\{0 \text{ if } j\neq y_i, 1 \text{ if } j=y_i\}$.
2. A vector $B'=(0^{s\_r*l}, B_{y\_0}, \ldots, B_{y\_\{r\_size-1\}}, \mathbf{0}^{s\_1*l})$ is formed by adding $s_r$ and $s_l$ zero vectors of dimension 1 to the left and right of the vector B, where $0^a$ denotes a zero vector of dimension a (refer to FIG. 12).
3. Calculate $c_2=\mathrm{Enc2}(B')$ and transmit the output to the homomorphic cyclic operation apparatus 120.

Similarity Calculation

In the similarity calculation phase, the homomorphic cyclic operation apparatus 120 takes the public key pk, the ciphertext $c_1$ generated during the registration, and the ciphertext $c_2$ generated during the query as inputs and performs the following computation:

1. Prepare an empty set C={ }.
2. For $j=-s_l, \ldots, s_r$, calculate a to d as follows:
   a. $c=\mathrm{HomCycle}(c_1, 1*j)$
   b. $c_{ip}=\mathrm{HomIP}_{pk}(c, c_2)$
   c. Generate $r=(0, r_1, r_2, \ldots, r_{n-1})$ ($r_i$ is uniformly random over the plaintext space of the encryption scheme).
   d. $c_r=\mathrm{Enc}(r)$
   e. Add $c=\mathrm{HomAdd}(c_{ip}, c_r)$ to C.
3. Output C and transmit it to the encryption apparatus 110.

Note that the calculations of a and b in the similarity calculation above may be $c=\mathrm{HomCycle}(c_2, 1*j)$ and $c_{ip}=\mathrm{HomIP}_{pk}(c, c_1)$. Further, the calculations from c to e in the similarity calculation above are for masking in order to prevent information leakage from non-constant terms in the homomorphic inner product operation. Therefore, these calculations may be omitted when there is no need to prevent information leakage.

Decryption

In the decryption phase, the encryption apparatus 110 takes the secret key sk and the ciphertext set C generated during the similarity calculation as inputs and performs the following computation:

1. Prepare an empty set M={ }.

2. For all c∈C, perform the following calculations:

a. Let $m=(m_0, m_1, \ldots, m_{n-1})$ be Dec(c).

b. Add $m_0$ to M.

3. Output M.

Although the homomorphic cyclic operation described in the second and the third example embodiments is a negative cyclic operation that multiplies the data by −1 when performing a shift, the above description has shown that they can be used to calculate similarity with modification. It should be noted that similarity calculation is merely an example to which a negative cyclic operation that multiplies the data by −1 when performing a shift can be applied and that the application examples of the homomorphic cyclic operation described in the second and the third example embodiment are not limited thereto.

Further, the homomorphic cyclic operation in the fourth example embodiment in combination with the homomorphic cyclic operation system, the homomorphic cyclic operation apparatus, the homomorphic cyclic operation method, and the homomorphic cyclic operation program of the first example embodiment are also able to realize a homomorphic cyclic operation system, a homomorphic cyclic operation apparatus, a homomorphic cyclic operation method, and a homomorphic cyclic operation program of the fourth example embodiment. Therefore, the homomorphic cyclic operation system, the homomorphic cyclic operation apparatus, the homomorphic cyclic operation method, and the homomorphic cyclic operation program of the fourth example embodiment are suitable for calculating the similarity between periodic arrays of data.

Fifth Example Embodiment

The following describes another application example of the homomorphic cyclic operations discussed in the second and the third example embodiment. A homomorphic cyclic operation in a fifth example embodiment is used for secure function evaluation. The following description refers to the encryption apparatus 110 and the homomorphic cyclic operation apparatus 120 discussed in the description of the first example embodiment, however, the apparatus configuration is not necessarily limited thereto.

The secure function evaluation is a process where a ciphertext Enc(m) of data m is registered in a database server, and while keeping a polynomial function with integer coefficients $f(x)=a_0+a_1*x+a_2*x^2+ \ldots +a_N*x^N$ hidden in the database, a user computes a function evaluation value $f(m)=a_0+a_1*m+a_2*m^2+ \ldots +a^N*M^N$. Note that it is permissible to publicly disclose the degree N of the polynomial to be evaluated and a secret key will be provided to the user through another secure means.

First, secure function evaluation that does not use any homomorphic cyclic operation will be described for comparison. This secure function evaluation without a homomorphic cyclic operation employs Horner's rule and utilizes the fact that $f(x)=a_0+a_1*x+a_2*x^2+ \ldots +a_N*x^N$ can be written as $f(x)=a_0+x*(a_1+x*(a_2+ \ldots x(a_{N-1}+x*a_N)))$. It is known that this Horner's rule allows for evaluating an n-degree polynomial with the minimum number of addition and multiplication operations.

1. The user calculates $Enc(a_0)$, $Enc(a_1)$, . . . , $Enc(a_N)$ and sends the results to the database server.

2. The database server computes Enc(f(m)) using homomorphic operations as follows and sends the result to the user:

a. $c=Enc(a_N)$ b. For i=N−1, N−2, . . . , 0, calculate the following:

1. c=HomMul(c, Enc(m))

2. $c=HomAdd(c, Enc(a_i))$

3. Let $m'=(m'_0, m'_1, \ldots, m'_{n-1})$ be Dec(c).

4. Let $m'_0$ be the evaluation value $f(m)=a_0+a_1*m+a_2*m^2+ \ldots +a^N*m^N$.

As can be seen from the computation above, in the secure function evaluation using the Horner's rule, for the degree N of the polynomial to be evaluated, the user calculates and sends the N+1 ciphertexts $Enc(a_0)$, $Enc(a_1)$, . . . , $Enc(a_N)$ to the database server. Therefore, as the degree N of the polynomial to be evaluated increases, both the user's encryption cost and the communication volume between the database servers will increase.

Even when the degree N of the polynomial to be evaluated is large, using a homomorphic cyclic operation will prevent the user's encryption cost and the communication volume between the database servers from increasing.

More concretely, the user calculates the function evaluation value $f(m)=a_0+a_1*m+a_2*m^2+ \ldots +a^N*m^N$ while keeping the polynomial function $f(x)=a_0+a_1*x+a_2*x^2++a_N*x^N$ hidden in the database server as follows:

1. First, the user calculates an inner product ciphertext $Enc2((a_0, a_1, \ldots, a_N))$ using a user terminal (the encryption apparatus 110) and sends the result to the database server.

2. The database server (the homomorphic cyclic operation apparatus 120) computes Enc(f(m)) using homomorphic operations as follows:

A. c=Enc(m)

B. Repeat the following process N−1 times to compute $Enc((m, m^2, \ldots, M^N))$.

a. c=HomMul(c, Enc(m))

b. c=HomCycle(c, 1)

c. c=HomAdd(c, Enc(m))

C. Compute $Enc((1, m, m^2, \ldots, m^N))$ in the following process:

a. c=HomCycle(c, 1)

b. c=HomAdd(c, Enc(1)) (calculate Enc(1) in advance)

D. Calculate the homomorphic inner product $c=HomIP(c, Enc2((a_0, a_1, \ldots, a_N)))$ of $c=Enc((m, m^2, \ldots, m^N))$ computed as described above and $Enc2((a_0, a_1, \ldots, a_N))$ sent by the user. After this calculation, $c=Enc(a_0+a_1*m+a_2*m^2+ \ldots +a^N*m^N)=Enc(f(m))$.

3. The user decrypts c using the user terminal (the encryption apparatus 110) and the secret key to extract the evaluation value f(m).

Now we will compare the secure function evaluation method (Horner's rule) without using a homomorphic cyclic operation with the secure function evaluation method using homomorphic cyclic operations according to the fifth example embodiment. The table below compares the secure function evaluation method (Horner's rule) without a homomorphic cyclic operation with the secure function evaluation method using homomorphic cyclic operations according to the fifth example embodiment. Note that the calculation costs of HomMul and HomCycle are the same, and so are the calculation costs of Enc and Enc2. The calculation costs can be compared by comparing the number of processes.

TABLE 3

| | No homomorphic cyclic operations | Using homomorphic cyclic operations |
|---|---|---|
| Encryption (user) | N + 1 times | Once |
| Communication volume from user to database server | N + 1 ciphertexts | 1 ciphertext |
| Homomorphic processing (database server) | HomMul: N times<br>HomAdd: N times | HomMul: N − 1 times<br>HomCycle: N times<br>HomAdd: N times |
| Communication volume from database server to user | 1 ciphertext | 1 ciphertext |
| Decrypt (user) | Once | Once |

As evident from the comparison table above, the secure function evaluation using homomorphic cyclic operations according to the fifth example embodiment requires less encryption computational cost and less communication volume from the user to the database server than the secure function evaluation that does not use a homomorphic cyclic operation. On the other hand, the computational cost of the homomorphic processing performed by the database server is higher in the secure function evaluation using homomorphic cyclic operations according to the fifth example embodiment than in the secure function evaluation without homomorphic cyclic operations. Therefore, the secure function evaluation using homomorphic cyclic operations according to the fifth example embodiment can be effectively utilized in cases where the user's terminal (the encryption apparatus 110) is underpowered, for example.

Further, the homomorphic cyclic operation in the fifth example embodiment in combination with the homomorphic cyclic operation system, the homomorphic cyclic operation apparatus, the homomorphic cyclic operation method, and the homomorphic cyclic operation program of the first example embodiment are also able to realize a homomorphic cyclic operation system, a homomorphic cyclic operation apparatus, a homomorphic cyclic operation method, and a homomorphic cyclic operation program of the fifth example embodiment. Therefore, the homomorphic cyclic operation system, the homomorphic cyclic operation apparatus, the homomorphic cyclic operation method, and the homomorphic cyclic operation program of the fifth example embodiment are suitable for performing secure function evaluation.

Some or all of the example embodiments above can be described as (but not limited to) the following Supplementary Notes.

[Supplementary Note 1]

A homomorphic cyclic operation system performing a homomorphic cyclic operation on a periodic array of data using homomorphic encryption having a homomorphic operation defined with respect to at least one multiplication, the homomorphic cyclic operation system comprising:

- an encryption apparatus that encrypts the periodic array of data by storing it in the coefficients of an indeterminate polynomial to generate a ciphertext of periodic data; and
- a homomorphic cyclic operation apparatus that shifts the periodic array of data in the ciphertext of the periodic data by applying the indeterminate raised to the power of a shift amount to the ciphertext of the periodic data.

[Supplementary Note 2]

The homomorphic cyclic operation system according to Supplementary Note 1, wherein the homomorphic cyclic operation apparatus shifts the periodic array of data in the ciphertext of the periodic data by homomorphically multiplying a value obtained by encrypting the indeterminate raised to the power of the shift amount by the ciphertext of the periodic data.

[Supplementary Note 3]

The homomorphic cyclic operation system according to Supplementary Note 1, wherein the homomorphic cyclic operation apparatus shifts the periodic array of data in the ciphertext of the periodic data by scalar multiplying the ciphertext of the periodic data by the indeterminate substituted by the base raised to the power of the shift amount.

[Supplementary Note 4]

The homomorphic cyclic operation system according to Supplementary Note 3, wherein the base r is a number that satisfies $r^n \equiv -1 \bmod d$ when a cycle n of the array and a ciphertext space size d are used.

[Supplementary Note 5]

The homomorphic cyclic operation system according to any one of Supplementary Notes 1 to 4, wherein the encryption apparatus adds a noise vector to the periodic array of data before encrypting the periodic array of data by storing it in the coefficients of an indeterminate polynomial.

[Supplementary Note 6]

The homomorphic cyclic operation system according to any one of Supplementary Notes 1 to 5, wherein the encryption apparatus makes the periodic array of data periodically redundant before encrypting the periodic array of data by storing it in the coefficients of an indeterminate polynomial.

[Supplementary Note 7]

The homomorphic cyclic operation system according to any one of Supplementary Notes 1 to 5, wherein

- the periodic array represents the coefficients of an evaluation polynomial to be evaluated by substituting values for evaluation purposes,
- the encryption apparatus encrypts the coefficients of the evaluation polynomial, and
- the homomorphic cyclic operation apparatus obtains a ciphertext of the evaluation polynomial substituted with the values for evaluation purposes by repeatedly shifting by one a ciphertext obtained by encrypting the values for evaluation purposes, repeatedly multiplying the ciphertext by itself, and calculating the inner product of the result of the shifting and the multiplying and a ciphertext of the coefficients of the evaluation polynomial.

[Supplementary Note 8]

A homomorphic cyclic operation apparatus performing a homomorphic cyclic operation on a periodic array of data using homomorphic encryption having a homomorphic operation defined with respect to at least one multiplication, wherein the homomorphic cyclic operation i apparatus shifts the periodic array of data in a ciphertext of periodic data by encrypting the periodic array of data by storing it in the coefficients of an indeterminate polynomial to generate the ciphertext and applying the indeterminate raised to the power of a shift amount to the ciphertext.

[Supplementary Note 9]

A homomorphic cyclic operation method performing a homomorphic cyclic operation on a periodic array of data using homomorphic encryption having a homomorphic operation defined with respect to at least one multiplication, the homomorphic cyclic operation metho-d comprising:

a step of encrypting the periodic array of data by storing it in the coefficients of an indeterminate polynomial to generate a ciphertext of periodic data; and a step of shifting the periodic array of data in the ciphertext of the periodic data by applying the indeterminate raised to the power of a shift amount to the ciphertext of the periodic data.

[Supplementary Note 10]

A program causing a computer to perform a homomorphic cyclic operation on a periodic array of data using homomorphic encryption having a homomorphic operation defined with respect to at least one multiplication, wherein the program shifts the periodic array of data in a ciphertext of periodic data by applying the indeterminate raised to the power of a shift amount to the ciphertext, wherein the ciphertext of the periodic data is encrypted by storing it in the coefficients of an indeterminate polynomial.

Further, the disclosure of Non-Patent Literature cited above is incorporated herein in its entirety by reference thereto. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literatures cited above as necessary, in combination with the matters described herein, as part of the disclosure of the present invention in accordance with the object thereof shall be considered to be included in the disclosed matters of the present application.

REFERENCE SIGNS LIST

100: homomorphic cyclic operation system
110: encryption apparatus
120: homomorphic cyclic operation apparatus
121: storage part
122: reception part
123: operation part
10: hardware configuration
11: CPU (Central Processing Unit)
12: primary storage device
13: auxiliary storage device
14: IF (interface) part

The invention claimed is:

1. A homomorphic cyclic operation system performing a homomorphic cyclic operation on a periodic array of data using homomorphic encryption having a homomorphic operation defined with respect to at least one multiplication, the homomorphic cyclic operation system comprising:

an encryption apparatus that encrypts the periodic array of data by storing the periodic array in the coefficients of an indeterminate polynomial to generate a ciphertext of periodic data; and a homomorphic cyclic operation apparatus that shifts the periodic array of data in the ciphertext of the periodic data by multiplying the indeterminate raised to the power of a shift amount to the ciphertext of the periodic data, wherein the periodic array is formed by selecting rows corresponding to the periodic data from a score table indicating the similarity relationships between each element of the periodic data and connecting the rows into a single line, and wherein the homomorphic cyclic operation apparatus calculates similarity between the periodic data and a comparison periodic data by performing an inner product operation between the ciphertext of the periodic array and the ciphertext of the comparison array which assigns 1 to matching positions and 0 to non-matching positions based on elements contained in the comparison periodic data, after shifting the ciphertext of the periodic array.

2. The homomorphic cyclic operation system according to claim 1, wherein the homomorphic cyclic operation apparatus shifts the periodic array of data in the ciphertext of the periodic data by homomorphically multiplying a value obtained by encrypting the indeterminate raised to the power of the shift amount by the ciphertext of the periodic data.

3. The homomorphic cyclic operation system according to claim 1, wherein the homomorphic cyclic operation apparatus shifts the periodic array of data in the ciphertext of the periodic data by scalar multiplying the ciphertext of the periodic data by the indeterminate substituted by the base raised to the power of the shift amount.

4. The homomorphic cyclic operation system according to claim 3, wherein the base r is a number that satisfies $r^n \equiv -1 \bmod d$ when a cycle n of the array and a ciphertext space size d are used.

5. The homomorphic cyclic operation system according to claim 1, wherein the encryption apparatus adds a noise vector to the periodic array of data before encrypting the periodic array of data by storing the periodic array in the coefficients of an indeterminate polynomial.

6. The homomorphic cyclic operation system according to claim 1, wherein the encryption apparatus makes the periodic array of data periodically redundant before encrypting the periodic array of data by storing the periodic array in the coefficients of an indeterminate polynomial.

7. The homomorphic cyclic operation system according to claim 1, wherein:

the periodic array represents the coefficients of an evaluation polynomial to be evaluated by substituting values for evaluation purposes, the encryption apparatus encrypts the coefficients of the evaluation polynomial, and the homomorphic cyclic operation apparatus obtains a ciphertext of the evaluation polynomial substituted with the values for evaluation purposes by repeatedly shifting by one a ciphertext obtained by encrypting the values for evaluation purposes, repeatedly multiplying the ciphertext by itself, and calculating the inner product of the result of the shifting and the multiplying and a ciphertext of the coefficients of the evaluation polynomial.

8. A homomorphic cyclic operation apparatus performing a homomorphic cyclic operation on a periodic array of data using homomorphic encryption having a homomorphic operation defined with respect to at least one multiplication, wherein:

a periodic array is formed by selecting rows corresponding to a periodic data from a score table indicating the similarity relationships between each element of the periodic data and connecting the rows into a single line, and the homomorphic cyclic operation apparatus shifts the periodic array in a ciphertext of periodic data by encrypting the periodic array of data by storing the periodic array in the coefficients of an indeterminate polynomial to generate the ciphertext and multiplying the indeterminate raised to the power of a shift amount to the ciphertext, and calculates similarity between the periodic data and a comparison periodic data by performing an inner product operation between the ciphertext of the periodic array and the ciphertext of the comparison array which assigns 1 to matching positions and 0 to non-matching positions based on elements contained in a comparison periodic data.

9. The homomorphic cyclic operation apparatus according to claim 8, wherein the homomorphic cyclic operation apparatus shifts the periodic array of data in the ciphertext of the periodic data by homomorphically multiplying a value obtained by encrypting the indeterminate raised to the power of the shift amount by the ciphertext of the periodic data.

10. The homomorphic cyclic operation apparatus according to claim 8, wherein the homomorphic cyclic operation apparatus shifts the periodic array of data in the ciphertext of the periodic data by scalar multiplying the ciphertext of the periodic data by the indeterminate substituted by the base raised to the power of the shift amount.

11. The homomorphic cyclic operation apparatus according to claim 10, wherein the base r is a number that satisfies $r^n \equiv -1 \bmod d$ when a cycle n of the array and a ciphertext space size d are used.

12. A homomorphic cyclic operation method performing a homomorphic cyclic operation on a periodic array of data using homomorphic encryption having a homomorphic operation defined with respect to at least one multiplication wherein a periodic array is formed by selecting rows corresponding to a periodic data from a score table indicating the similarity relationships between each element of the periodic data and connecting the rows into a single line, the homomorphic cyclic operation method comprising:

encrypting the periodic array of data by storing the periodic array in the coefficients of an indeterminate polynomial to generate a ciphertext of periodic data;

shifting the periodic array of data in the ciphertext of the periodic data by multiplying the indeterminate raised to the power of a shift amount to the ciphertext of the periodic data; and calculating similarity between the periodic data and a comparison periodic data by performing an inner product operation between the ciphertext of the periodic array and the ciphertext of the comparison array which assigns 1 to matching positions and 0 to non-matching positions based on elements contained in a comparison periodic data.

13. The homomorphic cyclic operation method according to claim 12, wherein the shifting the periodic array of data in the ciphertext of the periodic data is performed by homomorphically multiplying a value obtained by encrypting the indeterminate raised to the power of the shift amount by the ciphertext of the periodic data.

14. The homomorphic cyclic operation method according to claim 12, wherein the shifting the periodic array of data in the ciphertext of the periodic data is performed by scalar multiplying the ciphertext of the periodic data by the indeterminate substituted by the base raised to the power of the shift amount.

15. The homomorphic cyclic operation method according to claim 14, wherein the base r is a number that satisfies $r^n \equiv -1 \bmod d$ when a cycle n of the array and a ciphertext space size d are used.

16. A non-transitory computer readable medium storing a program causing a computer to perform a homomorphic cyclic operation on a periodic array of data using homomorphic encryption having a homomorphic operation defined with respect to at least one multiplication, wherein:

the periodic array is formed by selecting rows corresponding to the periodic data from a score table indicating the similarity relationships between each element of the periodic data and connecting the rows into a single line, and the program shifts the periodic array of data in a ciphertext of periodic data by multiplying the indeterminate raised to the power of a shift amount to the ciphertext, wherein the ciphertext of the periodic data is encrypted by storing the periodic array in the coefficients of an indeterminate polynomial, and calculates similarity between the periodic data and a comparison periodic data by performing an inner product operation between the ciphertext of the periodic array and the ciphertext of the comparison array which assigns 1 to matching positions and 0 to non-matching positions based on elements contained in a comparison periodic data.

17. The non-transitory computer readable medium storing the program according to claim 16, wherein the program shifts the periodic array of data in the ciphertext of the periodic data by homomorphically multiplying a value obtained by encrypting the indeterminate raised to the power of the shift amount by the ciphertext of the periodic data.

18. The non-transitory computer readable medium storing the program according to claim 16, wherein the program shifts the periodic array of data in the ciphertext of the periodic data by scalar multiplying the ciphertext of the periodic data by the indeterminate substituted by the base raised to the power of the shift amount.

19. The non-transitory computer readable medium storing the program according to claim 18, wherein the base r is a number that satisfies $r^n \equiv -1 \bmod d$ when a cycle n of the array and a ciphertext space size d are used.

* * * * *